United States Patent [19]
Schlich

[11] Patent Number: 5,285,113
[45] Date of Patent: Feb. 8, 1994

[54] CIRCUIT CONTROL APPARATUS FOR BOAT TRAILERS
[75] Inventor: Anthony C. Schlich, Duluth, Ga.
[73] Assignee: Remarkable Products, Inc., Duluth, Ga.
[21] Appl. No.: 716,532
[22] Filed: Jun. 17, 1991
[51] Int. Cl.$^5$ .............................................. B60L 1/00
[52] U.S. Cl. ................................... 307/9.1; 307/10.1
[58] Field of Search ..................... 307/118, 9.1, 10.1; 361/178; 340/984, 431, 450, 623, 686, 901

[56] References Cited
U.S. PATENT DOCUMENTS
4,620,109 9/1986 Kummer ........................ 307/102 S Primary Examiner—A. D. Pellinen
Assistant Examiner—Aditya Krishnan
Attorney, Agent, or Firm—Porter, Wright, Morris and Arthur

[57] ABSTRACT

Input current from the automobile lighting circuitry is conducted to movable poles on a first relay. Normally open contacts in the first relay are connected through output conductors to corresponding lighting circuits on the boat trailer. The first relay contacts close when operating voltage is applied to the first relay coil via a normally closed contact in a second relay. When a float switch on the trailer enters water, it closes, thereby actuating a transistor which, in turn, actuates the second relay. Upon actuation, the normally closed second relay contact opens, thereby deactivating the first relay and arresting current flow to the trailer. The transistor is maintained in an "ON" state for a period of time after the trailer emerges from water by current from a capacitor. The capacitor receives a charge via the second relay upon application of the automobile brake pedal only when the transistor is in the "ON" state.

10 Claims, 1 Drawing Sheet

CIRCUIT CONTROL APPARATUS FOR BOAT TRAILERS

BACKGROUND OF THE INVENTION

The present invention relates, in general, to the control of electricity to the lights on a boat trailer and, more particularly, to apparatus for automatically disconnecting the electrical circuits on a boat trailer from the corresponding circuits on a towing vehicle when the trailer is placed in a body of water during launching and reloading of a water craft.

When a boat is being towed to and from a launching area, highway safety laws require the boat trailer to be provided with running lights, brake lights, and turn signal indicators. These lights are energized by connecting them to corresponding electrical circuitry on the towing vehicle. In order to launch or reload the boat on the trailer, the trailer is typically backed down an inclined ramp into the body of water, thereby permitting the flotation properties of the boat to make boat launching and boat reloading a relatively easy task. As a result, a substantial portion of the trailer's lighting system is submerged for a period of time. If the electrical system on the trailer has not been disconnected before the trailer is submerged, the light bulbs on the boat trailer which are or become energized during submersion are likely to break because of contrasting temperatures between the bulb and the water and the electrolytic effect of submerging both poles of the bulb in a conductive medium. There is also a possibility that if several light bulbs break, the current draw will be sufficient to blow the fuse as well. In order to prevent the foregoing from occurring, boaters typically disconnect the trailer's electrical circuitry before backing the trailer into the water. Physical disconnection is a frequently overlooked task, particularly when others are waiting to use the launch ramp.

The foregoing problem was addressed in U.S. Pat. No. 4,620,109 (Kummer) which discloses an electrical circuit for disconnecting the lights on a boat trailer from those on the towing vehicle. The circuitry disclosed in the foregoing patent requires the operator to turn on the headlights on the towing vehicle and shift it into reverse in order to disconnect the trailer lights and, upon withdrawing the trailer from the water, to turn off the headlights on the towing vehicle for a brief instant in order to reactivate the trailer lights. The foregoing approach has several disadvantages. First, it requires the operator to take certain steps which are no easier to remember than the earlier practice of disconnecting the electrical coupling between the trailer and the car. Secondly, the driver of the towing vehicle may unknowingly de-energize the trailer lighting system during normal driving conditions. If the trailer is being towed at night or at other times when the towing vehicle's lights are on and the towing vehicle is shifted into reverse (for instance, to back out of a parking space), the trailer will lose all of its lights. Likewise, if the driver of the towing vehicle forgets to turn off the vehicle's headlights for a brief instant after pulling the trailer from the water, the lighting system on the trailer will not become re-energized. Third, if the operator failed to provide enough time for water to drain out of the trailer light housings before switching the headlights off, the trailer lights would be reactivated while a destructive water environment was still present. Thus, the present inventor was faced with the problem of devising a reliable and relatively inexpensive circuit capable of automatically disabling the trailer lighting circuitry as the trailer was entering a body of water and then automatically re-energizing the trailer lights after sufficient time had elapsed for water to drain out of the trailer light housings upon emerging from the boat ramp.

SUMMARY AND OBJECTS OF THE INVENTION

The present invention controls the application of current from the electrical circuitry of a towing vehicle to the electrical circuitry of a trailer upon entrance and exit of the trailer into and from a body of water and basically comprises: (a) input components for receiving current from the towing vehicle and for providing an operating voltage; (b) output components for conducting current to the trailer; (c) a first switching device responsive to the operating voltage for connecting and disconnecting the input and output components; and (d) a subcircuit for removing the operating voltage from the first switching device as the trailer enters the body of water and for delaying the application of the operating voltage to the first switching device for an interval of time after the trailer exists the body of water. Preferably, the first switching device is a first relay having at least one movable pole electrically connected to the input components and at least one normally open contact connected to the output components. Likewise, the subcircuit is preferably comprised of a second relay having a movable pole electrically connected to the input components and a normally closed contact connected to the first relay, a semiconductor switch connected at opposite poles to the second relay and to a system common, a float switch responsive to the entrance of the trailer into the body of water and electrically connected to the normally closed contact on the second relay and to the semiconducter device, and a capacitor electrically connected to a junction between the float switch and the semiconductor device.

A primary object of the present invention is to provide a fully automatic circuit for controlling the application of current to the boat trailer without requiring the operator to take any special steps. A further object of the present apparatus is to provide a delay that prevents the return to normal operation of the trailer's electrical circuit after the trailer emerges from the water. Yet another object is to prevent the current from continuously flowing through the float switch once it is submerged. Further objects and advantages may be more readily understood in light of the following drawings and detailed description of the preferred embodiments.

DETAILED DESCRIPTION OF THE PREFERRED EMBODIMENT

Figure 1:
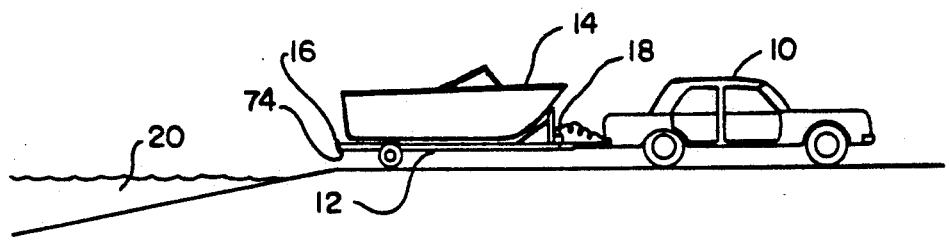
FIG. 1 is an elevational view of a towing vehicle and a trailer bearing a boat thereon.

Referring now to the drawings where the illustrations are for the purpose of describing the preferred embodiment of the present invention and are not intended to limit the invention described herein, FIG. 1 is an elevational view of an automobile 10 towing a trailer 12 upon which a boat 14 is carried. The trailer is provided in the usual manner with running lights, brake lights and turn signal indicators mounted in rearwardly disposed housings 16. The trailer is also equipped with a conventional wiring harness (not shown) by which current is provided to the lights. A conventional connector plug (not shown) is provided on the forward end of the trailer's wiring harness. Likewise, the car 10 is equipped with a conventional wiring harness, and a conventional connector plug (not shown) is attached to the harness at the rear of the car 10 in a manner well known in the art. In the foregoing manner, suitable connections and circuitry are provided to energize corresponding lights on the automobile 10 and the trailer 12.

The applicant's invention is preferably embodied in an electrical apparatus, generally designated 18, which is interposed between the electrical connectors on the car 10 and trailer 12. The subject apparatus 18 automatically disconnects the lights on the trailer 12 as the trailer 12 is being placed in a body of water 20 for launching the boat 14 and then reconnects the lights after the trailer 12 has been removed from the water 20 for a period of time.

Figure 2:
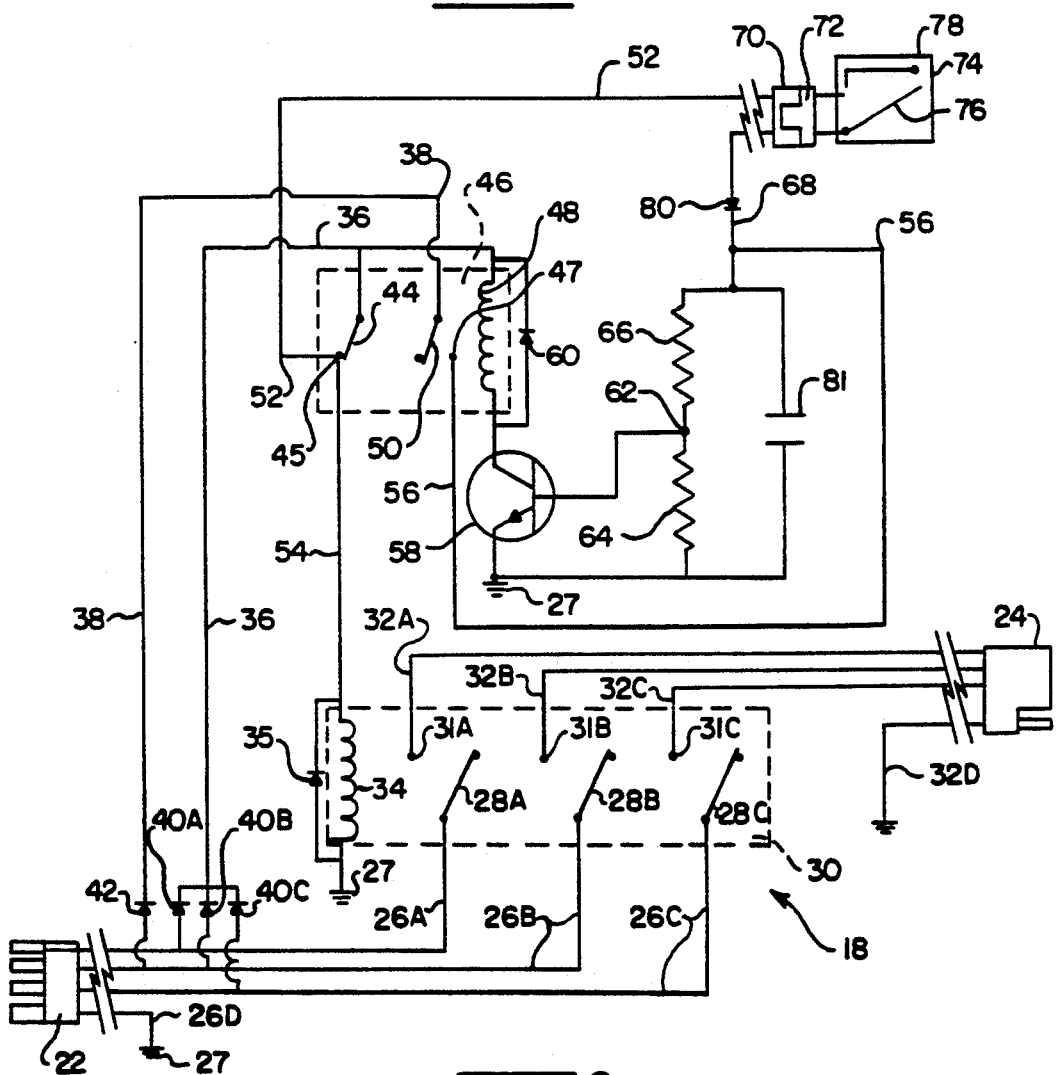
FIG. 2 is an electrical schematic drawing of the present invention.

Referring now to FIG. 2, a schematic drawing of the subject apparatus 18 is illustrated. A four-terminal connector or input plug 22 is provided on the present device 18 for attachment to the four-pole connector (not shown) on the car 10. Three input conductors 26A-C extend from the connector 22 to base contacts on the movable poles 28A-C of a three-pole double-throw first relay 30. Output conductors 32A-C are connected to normally open contacts 31A-C on the first relay 30 and extend to a four-terminal connector or plug 24 adapted to be coupled to the four-terminal connector on the trailer 12. The input and output plugs 22 and 24 are also provided in the usual manner with grounded conductors 26D and 32D, respectively, connected to a system common 27. Likewise, the first relay 30 is provided with an electromagnetic coil connected at one end to the system common 27 and provided with a blocking mode 35. Preferably, the first relay 30 is designed for over one-hundred thousand actuations, has a coil resistance of approximately 200 ohms, and is sealed to prevent dirt and moisture from entering.

A primary branch conductor 36 and a secondary branch conductor 38 are electrically connected to the input conductors 26A-C Preferably, the primary branch conductor 36 is connected to all three input conductors 26A-C, so that it will carry an operating voltage whenever any of the running, braking or turning lights on the towing vehicle is activated. Blocking diodes 40A-C prevent current backflow from the primary branch conductor 36 into any of the input conductors 26A-C. The secondary branch conductor 38 is connected to one of the input conductors 26B, which preferably carries the brake light signal. As more fully described below, the brake light input conductor 26B is preferable because it is the most likely of the car lighting circuits to be activated once the trailer has been in the body of water 20 for a period of time during removal or remounting of the boat 14. Like the primary branch conductor 36, the secondary branch conductor 38 is provided with a blocking diode 42 to prevent current backflow into the brake light input conductor 26B.

The primary branch conductor 36 is electrically connected to a base portion of a first movable pole 44 in a two-pole, double-throw second relay 46, as well as to one end of an electromagnetic coil 48 in said second relay 46. The secondary branch conductor 38 is electrically connected to a base portion of a second movable pole 50 in the second relay 46. A normally closed contact 45 associated with the first movable pole 44 serves as a junction for a first float switch conductor 52 and a first relay coil conductor 54. A normally open contact 47 associated with the second movable pole 50 is connected to a charging conductor 56. The electromagnetic coil 48 in the second relay 46 is electrically connected at its end opposite the primary branch conductor 36 to the collector of a semiconductor device 58. In the usual manner, the coil 48 is provided with a blocking diode 60. Preferably, the above-described two-pole, double-throw second relay 46 is sealed to prevent dirt and moisture from entering. Alternatively, the first and second relays 30,46 may be unsealed, if the present apparatus 20 is housed in a sealed container 18. Preferably, the second relay 46 has a coil resistance of approximately 200 ohms and a coil current requirement of approximately 50 milliamps.

The semiconductor device 58 is preferably an NPN transistor having a current rating of about 0.5 amps, a breakdown rate of 60 volts and a base drive requirement of approximately five microamps. The emitter of the transistor 58 is connected to the system common 27, and the base is electrically connected to a junction 62 between a pair of resistors 64 and 66 which form a voltage divider.

The normally open pole 47 of the second relay 46 is electrically connected via the charging conductor 56, to a second float switch conductor 68. Preferably, the first and second float switch conductors 52 and 68 are connected to a separable plug 70,72. As indicated in FIG. 1, a float switch 74 is mounted on a rear and lower portion of the trailer 12 and is electrically connected to the second half of the connecting plug 70,72. The float switch 74 is constructed so that a movable pole 76 housed therein completes a circuit with a normally open contact 78 upon entrance of the float switch 74 into a body of water 18.

A blocking diode 80 is provided on the conductor 68 between the plug 70 and the charging conductor 56. The voltage divider resistors 64, 66 are disposed in parallel to a capacitor 81, and are electrically connected to the junction between the charging and float switch conductors 56,68, the transistor 58 and the system common 27. Preferably, lead resistor 66 has a value of twenty-two thousand (22K) ohms and the grounded resistor 64 has a value of ten thousand (10K) ohms. The capacitor 81 preferably has a valve of 2200 microfarads and is connected at one plate to the float switch 74 and to the lead resistor 66 and at the opposite plate to the system common 27.

The present invention operates in the following manner. When any of the running lights, brake lights, turn signal indicators, or emergency flasher lights on the automobile 10 is energized, an input current is applied to the base of one or more of the movable poles 28A-C of the first relay 30 via the input plug 22 and one or more of the input conductors 26A-C. Simultaneously, the input current is rectified by one or more of the diodes 40A-C, thereby providing an operating voltage that is applied, via the primary branch conductor 36, the pole 44 and the normally closed contact 45 of the second relay 46 and the coil conductor 54 to the first relay coil 34. The application of the operating voltage to the first relay coil 34 closes the normally open contacts 31A-C of the first relay 30, whereupon current carried in one or more of the input conductors 26A-C travels through the corresponding output conductors 32A-C and output plug 24 to illuminate one or more lamps on the trailer.

When the trailer 12 is backed into the water 20, the normally open contact 78 in the float switch 74 closes. When any of the car lights is energized, an operating voltage reaches the float switch 74 via the primary branch conductor 36, the normally closed second relay contact 45, the first float switch conductor 52,. and the plug 70,72. Since the float switch 74 is now closed, the operating voltage reaches the voltage divider 64,66 and the capacitor 81, via the plug 70,72 and the second float switch conductor 68. The capacitor 81 begins to charge and the voltage divider 64,66 permits at least a portion of the operating voltage to be applied to the base of the transistor 58, The application of current to the base of the transistor 58 results in its actuation, whereupon a current path is completed from the primary branch conductor 36 through the second relay coil 48, and through the transistor 58 to the system common 27. In this manner, an operating voltage is established in the second relay coil 48, whereupon the normally closed contact 45 is opened. With contact 45 open, current from the primary branch conductor 36 can no longer reach the first relay coil 34, nor the float switch 72. Absent voltage across the first relay coil 34, the first relay contacts 28A-C return to their normally open state, and input current can no longer reach the output conductors 32A-C nor the boat trailer.

With the opening of the normally closed second relay contact 45, current from the primary branch conductor 36 cannot reach the transistor 58 via the still closed float switch 74. Thus, another current route is needed in order to keep the transistor 58 in an "ON" state; otherwise, the normally closed contact 45 in the second relay 46 will close, operating voltage will be applied to the first relay coil 34 and the input current from the car will activate the trailer lights while the trailer is still submerged. This undesirable result is avoided as follows. The capacitor 81 receives a portion of the current applied to the base of the transistor 58 during the brief interval of time between the float switch 74 first entering the water 20 and the opening of the normally closed second relay contact 45. The capacitor 81 stores a charge during the above-described interval and begins to release it when the current no longer reaches it via the float switch 74. Since the diode 80 Prevents current backflow into the float switch 74, a small charge provided by the capacitor is applied to the base of the transistor 58, thereby maintaining the transistor in the "ON" state for an interval of time whose length depends, in part, upon the size of the resistors 64,66.

In addition, the following sequence is relied upon to maintain transistor actuation. Simultaneously with the opening of the normally closed second relay contact 45, the normally open second relay contact 47 closes. Operating voltage may then be applied to the voltage divider resistors 64,66 and to the capacitor 81 via the secondary branch conductor 38, the now-closed second relay contact 47 and the charging conductor 56. Since the secondary branch conductor 38 is preferably associated with the towing vehicle's brake lamp circuitry, whenever the operator applies the brakes during entrance or exit of the trailer from the water, operating voltage will be supplied to the base of the transistor 58 and to the capacitor 81. When the operator does not touch the brake pedal, the capacitor 81 will begin to discharge, thereby maintaining the transistor 58 in the "ON" state.

Advantageously, the blocking diode 80 on the float switch conductor 68 prevents current supplied via the above-described route from reaching the still submerged float switch 74. In addition, since the normally closed second relay contact 45 is open, the submerged float switch 74 is electrically isolated. This isolation is advantageous to the longevity of the float switch 74 and the present apparatus 18.

Typically, the driver must leave the car 10 to separate or attach the boat from or to the trailer 12 once the trailer is in the water 20. If the capacitor 81 discharges to the point where the voltage applied to the base of the transistor 58 is insufficient to keep said transistor in an actuated state, the second relay coil 48 deactivates for a brief instant. During this time interval, the normally closed second relay contact 45 returns to its closed state. Current provided by the towing vehicle to the primary branch conductor will then be applied to the capacitor 81 and transistor 58 via the still-closed float switch 74 and its associated conductors 52,68. Operating voltage is then re-established across the second relay's coil 48 since the transistor 58 is again energized, thereby opening normally closed second relay contact 45 and preventing operating voltage from reaching the first relay coil 34.

Once the trailer 12 is out of the water, the float switch contact 78 opens, thereby preventing the above-described recharging of the capacitor 81. However, the alternate route to the capacitor 81 is still available, wherein prior to deactuation of the second relay coil 48, the towing vehicle brake is applied. In this event, a timing-out period, during which the transistor 58 is driven until the charge provided by the capacitor 81 is too weak to maintain the "ON" state, will not start until the brake pedal is released. Eventually, sufficient time will elapse between brake applications for the capacitor 81 to discharge and for the transistor 58 and the associated second relay coil 48 to become deactuated. The timing-out period (and any extensions thereof) provides an opportunity for trapped water to drain out of the trailer light housings 16. Absent the timing-out period, water trapped in the light housings could destroy the trailer light bulbs in the event that one or more of the car lights is left on or turned on while the trailer emerges from the water. After the timing-out period, the present apparatus resumes normal operation, wherein actuation of the brake lights, tail lights, turn signal indicators or emergency flashers on the automobile is immediately relayed to the corresponding circuitry on the boat trailer.

While a single preferred embodiment of the present invention has been illustrated and described in some detail, the foregoing disclosure is not intended to limit unduly the spirit or gist of the invention, nor the scope of the following claims.

I claim:

1. Apparatus for controlling the application of current from the electrical circuitry of a towing vehicle to the electrical circuitry of a trailer upon entrance and exit of said trailer into and from a body of water, said apparatus comprising;
   a) input means for receiving current from the towing vehicle and for providing an operating voltage;
   b) output means for conducting current to the trailer;

c) first switch means responsive to the operating voltage for connecting and disconnecting the input and output means; and d) subcircuit means for removing the operating voltage from the first switch means as the trailer enters the body of water and for delaying the application of the operating voltage to the first switch means for an interval of time after the trailer exits the body of water.

2. Apparatus according to claim 1, wherein the first switch means comprises a first relay having a coil electrically connected to the subcircuit means and to a system common, at least one normally open contact electrically connected to the output means and at least one movable pole electrically connected to the input means.

3. Apparatus according to claim 2, wherein the subcircuit means includes (a) a second relay having a coil electrically connected to the input means and to a semiconductor device, a normally closed contact electrically connected to the first relay coil and a first movable pole electrically connected to the input means; (b) a semiconductor device electrically connected to a float switch, the second relay coil and the system common; (c) a float switch responsive to the entrance of the trailer into the body of water and electrically connected to the normally closed contact on the second relay and to the semiconductor device, and (d) a capacitor electrically connected at one plate to the float switch and the semiconductor device, and at an opposite plate to the system common.

4. Apparatus according to claim 3, wherein the float switch is releasably mounted on a lower rear end portion of the trailer and is electrically connected to the normally closed second relay contact, the semiconductor device and the capacitor by a readily detachable connector.

5. Apparatus according to claim 3, wherein the semiconductor device is a transistor having a collector electrically connected to the second relay coil, an emitter electrically connected to the system common and a base electrically connected to the float switch and the capacitor.

6. Apparatus according to claim 5, wherein voltage divider means are electrically interposed between the semiconductor device and the float switch and capacitor.

7. Apparatus according to claim 6, wherein the voltage divider means comprises a pair of resistors disposed in series relation to one another and in parallel relation to the capacitor, said voltage divider means being electrically connected at one end to the system common and at the opposite end to the float switch and the capacitor, and wherein the base of the transistor is electrically connected to a junction between the transistors.

8. Apparatus according to claim 7, wherein the input means includes a primary branch conductor and a secondary branch conductor.

9. Apparatus according to claim 8, wherein the second relay coil and the first movable pole associated with the normally closed second relay contact are electrically connected to the primary branch conductor, and wherein the second relay includes a normally open contact electrically connected to the capacitor and to the voltage divider means and a second movable pole associated with the normally open contact and electrically connected to the secondary branch conductor.

10. Apparatus according to claim 9, wherein blocking means are electrically interposed between the float switch and a junction between the normally open second relay contact, the voltage divider means and the capacitor to prevent a backflow of current to said float switch.

* * * * *